Dec. 14, 1954 L. C. HELMS ET AL Re. 23,907

TRANSPARENCY VIEWER

Original Filed May 1, 1950 2 Sheets-Sheet 1

INVENTORS
LAURENCE C. HELMS
TRAVIS R. HELMS
MARTIN BROWNEYE
BY
Frank E. Liverance, Jr.
ATTORNEY

TRANSPARENCY VIEWER

Original Filed May 1, 1950 2 Sheets-Sheet 2

INVENTORS
LAURENCE C. HELMS
TRAVIS R. HELMS
MARTIN BROWNEYE
BY
Frank E. Livingance, Jr.
ATTORNEY United States Patent Office Re. 23,907
Reissued Dec. 14, 1954

23,907

TRANSPARENCY VIEWER

Laurence C. Helms, Travis R. Helms, and Martin Brown-eye, Grand Rapids, Mich., assignors to Helms Products, Inc., Grand Rapids, Mich., a corporation of Michigan Original No. 2,637,132, dated May 5, 1953, Serial No. 159,166, May 1, 1950. Application for reissue April 12, 1954, Serial No. 422,712

10 Claims. (Cl. 40—156)

Matter enclosed in heavy brackets [ ] appears in the original patent but forms no part of this reissue specification; matter printed in italics indicates the additions made by reissue.

This invention relates to a transparency viewer of an especially practical, effective, novel structure. A transparency carrying pictorial and other representations on thin material, stretched taut and supported in front of properly located lighting means, has the pictorial and other representations presented to best advantage. With our invention, a framed picture is provided, illuminated at the back with the light passing, either directly or by reflection, through the transparency, presenting the picture far better than the ordinary picture or the like is presented when merely framed and viewed from the front with only exterior lighting directed against it.

An understanding of the invention and of the novel, simple and very effective structure which we have produced may be had from the following description, taken in connection with the accompanying drawings, in which, Fig. 1 is a rear elevation of the transparency viewer with a transparency held therein, the back plate forming one major member of the structure being removed.

Figure 4:
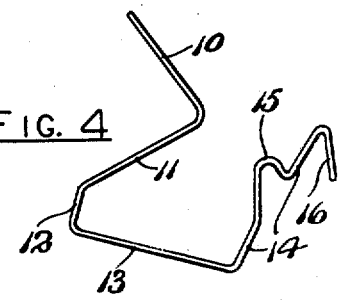
Figure 5:
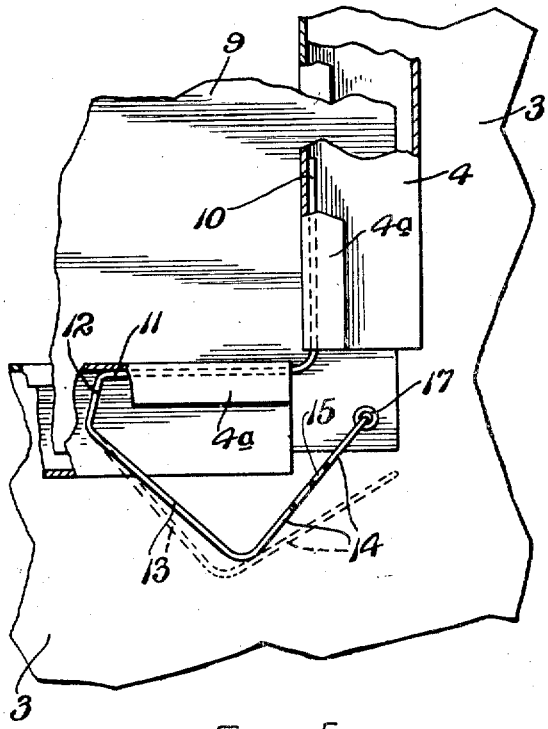

Fig. 4 is a perspective view of one of the clips 4 of which one is used at each corner of the transparency for mounting it in the frame and keeping it in taut condition, and Fig. 5 is a fragmentary enlarged interior elevation, with parts broken away and shown in section for better disclosure, showing the manner in which the clips are used, one at each corner of the transparency and connected to the frame.

Like reference characters refer to like parts in the different figures of the drawing.

Figure 3:
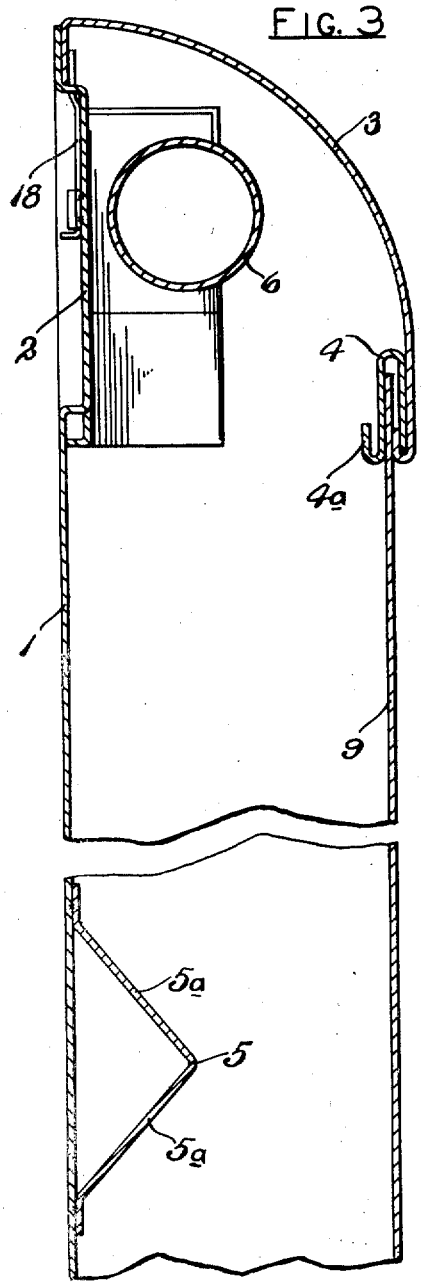
Fig. 3 is a fragmentary enlarged vertical section, substantially on the plane of line 3—3 of Fig. 2.

The structure embodying our invention includes a back plate 1, generally of rectangular form, made of flat metal which, a short distance inward from its end edges is pressed forwardly to make an elongated raised section 2 at the front side of the back, beyond which the plate 1 continues in a short lip as shown in Fig. 3. The frame which is closed at its rear side by the back 1 has upper, lower and end members 3 of generally arc shape in cross section which, as hereafter described, have the back 1 releasably latch connected thereto. Such frame members extend forwardly and inwardly in a curved arc and at their corners are mitered and welded or otherwise permanently secured together. Each of the frame members at its rear edge portion has an inwardly turned lip to come against the peripheral edge portions of the back plate 1 as shown in Fig. 3. Each of the said frame members 3, at its inner edge in front of the back, is returned bent into a short U-section into each of which an elongated transparency receiving fixture 4 is removably inserted, fixtures 4 being of U-shape in cross section and the inner leg of each terminating in a return bent lip 4a as shown.

Figure 2:
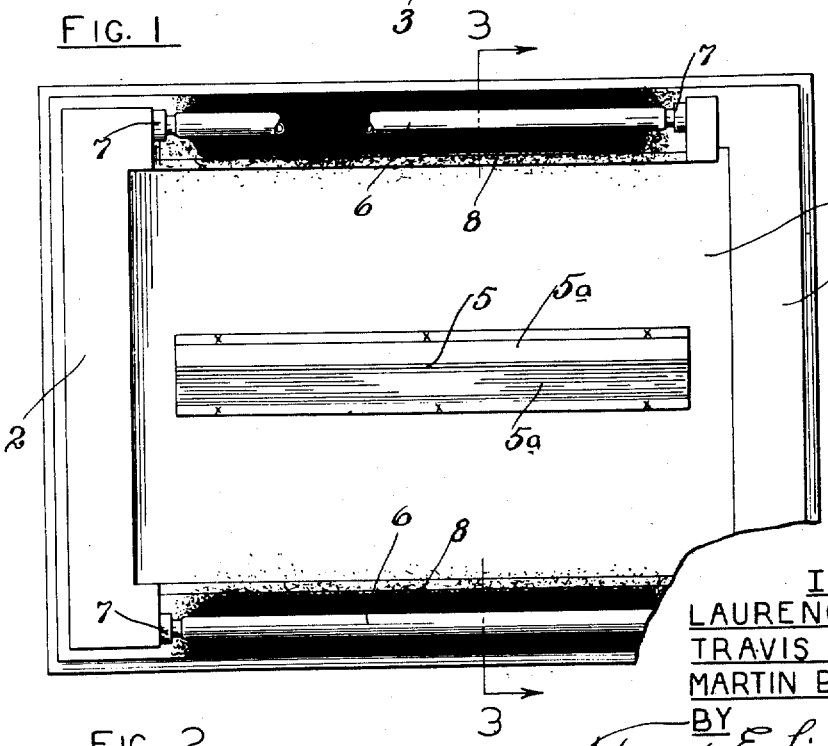
Fig. 2 is a front elevation of the back plate which is used to close the back of the transparency frame, as shown in Fig. 1.

The back, substantially midway between its upper and lower edges and at its front side, has a reflector 5 welded or otherwise permanently secured. Such reflector disposed horizontally at the front side of the back plate is V-shaped in cross section having upper and lower reflecting sides 5a meeting at an apex in front of the plate 1 where integrally connected. At the upper and lower parts of the back plate 1, lighting tubes 6 are detachably mounted at their ends in suitable sockets 7 to receive them, such tubes being one above the upper reflecting surface 5a and the other below the like lower reflecting surface. The plate 1 back of each lighting tube 6 is blackened for controlling the reflection of light and such blackening is progressively lessened downward from the upper tube and upward from the lower tube away from such tubes as shown in Fig. 2.

Figure 1:
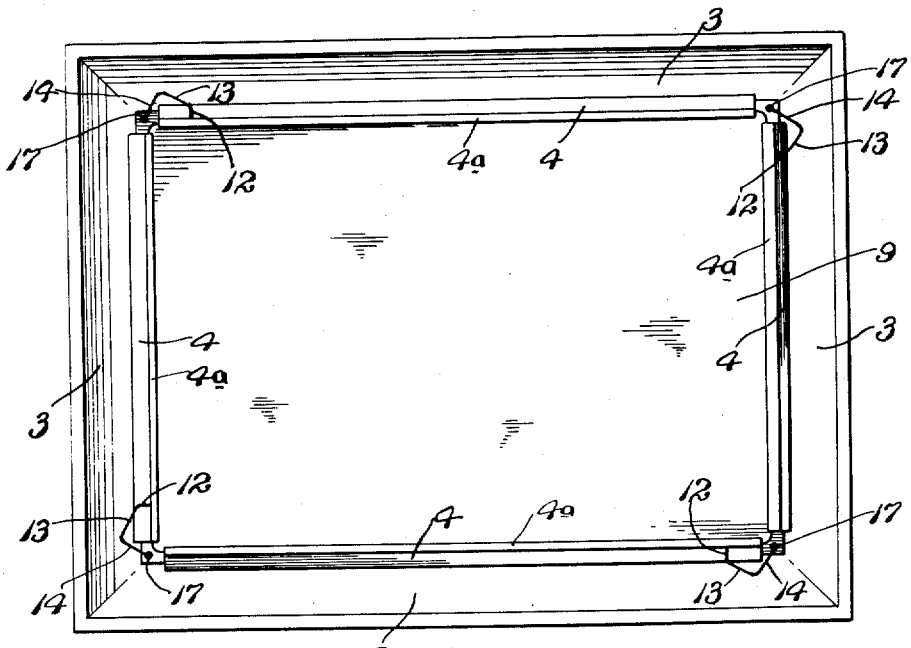

The transparency 9 upon which the pictorial or other representation is made is of rectangular outline and has dimensions such that its upper and lower and end edge portions are slidably received between the legs of the elongated fixtures 4. At the inner corners of the frame such transparency holding fixtures 4 are separated at their ends leaving the corners of the transparency 9 exposed as shown in Fig. 1. Each of said corners is connected by a resilient clip, shown in Fig. 4, with the end portions of the two adjacent fixtures 4 at each corner of the frame.

Each of said resilient clips is made from a length of resilient wire. At one end there is an arm 10, integrally connected with which is a second arm 11 substantially at right angles to it. The arm 11 is continued in a short section 12 from which an arm 13 extends for a distance, the wire being then bent to make a terminal arm 14 located generally at right angles to the arm 13 and having a raised hump 15 between its ends, and which at its free end has a short finger 16 bent at right angles.

Each of these resilient attaching clips is mounted as shown in Fig. 5. The arms 10 and 11 are received in the channels formed by the lips 4a and the bodies of the respective fixtures 4 at a corner of the frame, the connecting bend between the arms 10 and 11 turning the corner as shown in Fig. 5. The short arm 12 extends outwardly and the terminal finger 16 is inserted through an eye 17 fixed at the adjacent corner of the transparency 9. When thus attached the clip, which normally would occupy the dotted line position as shown in Fig. 5, is strained and moved to the full line position so that engagement may be made with the eye 17. Thus, with four of the clips, one at each corner of the transparency, there is provided tightening forces upon the transparency at all of the corners, the direction of the forces being outward from the approximate center of the transparency so that the transparency is maintained in a taut condition. The raised section or hump 15 is made for readily manual engagement to aid in inserting or withdrawing the terminal finger 16 from its associated eye 17.

In mounting the transparency in the frame it is laid flat against the return bent U portions surrounding the frame opening. The fixtures 4 are then slipped over the respective edges of the transparency with the outer legs of the fixtures inserted into said U sections of the frame. The clips are then applied as described, and when in place they exert an inward pressure on the fixtures at their ends, holding them firmly in place on the frame and straddling the edges of the transparency, and the clips also at the same time exert a tension on the transparency diagonally outward from its approximate center so that it is held taut across the frame opening under all conditions of swelling or shrinking. To remove the transparency the clips are first taken off and then the fixtures 4 slid off from the edges and the transparency is free, thus making it easy to change pictures from time to time.

The back, as shown in Fig. 3, when placed in position at the back of the frame members 3 is releasably held in place by sliding latches or bolts 18 as shown. Thus the back may be removed at any time, for example to remove or replace the lighting tubes 6 or for any inspection or repair which may be needed.

The light from the tubes 6 passed directly therefrom through the transparency and reflected light from the surfaces 5a and the back is substantially uniform, the surfaces of decreasing undesirable intensity at the top and bottom, the transparency being lighted with a soft illumination of general uniformity over its entire area.

The structure described is relatively simple to produce at low cost. The light passage through the transparency is substantially even over the whole area thereof. The invention embodied as described, in practical use, has proven exceptionally satisfactory. The claims appended define the invention which is to be considered comprehensive of all forms of structure coming within their scope.

We claim:

1. An open frame having sides and ends, a flexible transparency extending across the opening of said frame and overlapping the sides and ends thereof, elongated fixture detachably connected to the frame, one at each of the sides and ends of said opening and slidably embracing the edges of the transparency, and yieldingly resisting tension members connected to said transparency at corners thereof and also bearing against the end portions of adjacent fixtures at said corners, said tension members being under strain deformation and having inherent force therefrom acting to pull said transparency outwardly at each corner and to press said fixtures inwardly.

2. An open frame having sides and ends, channels on said sides and ends adjacent and back of the frame opening, said channels opening outwardly from said opening, a flexible transparency extending across said opening and overlapping the frame, a plurality of elongated fixtures, one at each side and at each end of the opening embracing the edges of said transparency, having portions entering said channels and a plurality of yieldingly resisting tension members detachably connected to the transparency, one at each corner portion thereof, and also engaging end portions of two of said fixtures at each corner of the transparency, said tension members being strained from normal form and providing force exerting means to pull said transparency outward at its corners and press said fixtures into connection with said channels.

3. The structure containing the elements in combination defined in claim 2, said tension members being of spring wire, each having an arm with a free end portion adapted to be inserted through said transparency at a corner portion thereof, and a second portion engageable with two adjacent fixtures and acting thereon to move them in an inward direction.

4. In a mounting for a transparency or the like, having a frame with a rectangular opening across which the transparency is adapted to be placed, the improvement comprising, a plurality of elongated fixtures, one at each side and end of the frame opening and back thereof, each having a channel received adjacent side and end portions of a transparency, means on said fixtures and means on said frame adjacent the sides and ends of the opening having cooperating connection and engagement for holding said fixtures from disconnection with the frame when moved inwardly, and resistingly yielding spring members, one at each of adjacent ends of said fixtures, each having one end detachably connected to an adjacent corner portion of the transparency, and at its opposite end portion engage with both end portions of two fixtures, said spring members being strained when thus connected to transmit an outward pull to the transparency at said corner portions thereof, and move said fixtures inwardly toward said opening.

5. In a mounting for a rectangular, flexible sheet member, having a frame surrounding a rectangular opening across which said sheet member is to be placed, the improvement comprising, an elongated fixture adjacent each side and end of said opening back of the frame, said frame at each side and end of said opening having a rearwardly and outwardly turned lip, and each fixture having a substantially Z-cross section, including a channel, open at its inner side, a side of which enters the adjacent lip on the frame, and between the sides of said channels of said fixtures the side and end portions of the sheet member are received, and each of said fixtures back of its said channel terminating in a rearwardly and outwardly extending lip, and spring members each detachably connected at one end with a corner portion of said sheet member, and engaging with and pressing inwardly under strain against the adjacent end portions of both fixtures at said corner of said sheet.

*6. An open frame having sides and ends, a flexible transparency extending across the opening of said frame and overlapping the inner edge portions of said sides and ends of the frame, thin metal elongated fixtures located at the inner side of and connected to the frame, one at each of the sides and ends of said opening, said fixtures covering the side and end edge portions of the transparency except at the corners thereof, said transparency edge portions being disposed between the inner sides of said sides and ends of the frame and said fixtures, and movable relative thereto, and yieldingly resisting tension members connected to said transparency, one at each corner thereof, bearing against the end portions of adjacent fixtures at said corners, said tension members being under strain deformation and acting to continuously pull against said transparency at each corner in an outward direction.*

*7. An open frame having sides and ends, a flexible transparency located at the inner side of said frame and across the opening thereof, overlapping at its edges the inner edge portions of said sides and ends of the frame, thin metal elongated fixtures located at the inner sides and adjacent the inner edge portions of said sides and ends of the frame secured thereto, covering the edge portions of said sides and ends of the transparency except at the corners thereof, and a yieldingly resisting tension member operatively mounted on the frame and connected, one at each corner of said transparency acting to yieldingly pull continuously outward upon said transparency at each of its corners.*

*8. An open frame having sides and ends, a flexible transparency located at the inner side of said frame and across the opening thereof, overlapping at its edges the inner edge portions of said sides and ends of the frame, thin metal elongated fixtures located at the inner sides and adjacent the inner edge portions of said sides and ends of the frame secured thereto, covering the edge portions of said sides and ends of the transparency except at the corners thereof, and a yieldingly resisting tension member connected, one at each corner of said transparency and bearing against the said fixtures at the end portions thereof adjacent the corners of said transparency, said tension members being under strain deformation and acting to yieldingly pull continuously outward upon said transparency at each of its corners.*

*9. An open frame having sides and ends, a flexible transparency located across the opening of said frame at the inner side thereof, having edge portions overlapping said sides and ends of the frame adjacent said opening thereof, thin metal elongated fixtures connected, one at the inner side of each side and end of the frame, connected thereto and closely covering the edge portions of said transparency, said edge portions of the transparency being disposed between the sides and ends of the frame and said fixtures, said fixtures at corners of the transparency uncovering and exposing the corners of said transparency, and a yielding spring means generally in fixed relation to said frame connected, one at each exposed corner of the transparency, acting continuously thereon to yieldingly pull on said transparency at each corner in an outward direction.*

*10. An open frame, a flexible transparency located across the opening of said frame at the inner side thereof, having edge portions overlapping edge portions of the frame around and adjacent said opening, a plurality of elongated fixtures of thin metal connected to the frame at its inner sides adjacent and around the opening in the frame, said fixtures substantially covering the edge portions of said transparency having end portions spaced from each other to thereby uncover and expose said transparency at selected spaced distances therearound, and a yielding spring means connected to said transparency at each uncovered portion thereof, and operatively connected to the frame to act continuously on said transparency at a plurality of spaced points to pull upon the transparency in an outward direction, and maintain the transparency in yielding taut condition.*

(References on following page)

References Cited in the file of this patent or the original patent.

UNITED STATES PATENTS

| Number | Name | Date |
|---|---|---|
| 587,241 | Seidel | July 27, 1897 |
| 951,921 | Spencer | Mar. 15, 1910 |
| 1,061,659 | Brandt | May 13, 1913 |
| 1,475,977 | West | Dec. 4, 1923 |
| 1,613,933 | Castleton | Jan. 11, 1927 |
| 1,969,244 | Venzie | Aug. 7, 1934 |
| 2,050,757 | Leon | Aug. 11, 1936 |
| 2,524,216 | Weisman | Oct. 3, 1950 |
| 2,565,218 | Freeborn | Aug. 21, 1951 |

FOREIGN PATENTS

| Number | Country | Date |
|---|---|---|
| 22,990 | Great Britain | Oct. 8, 1912 |
| 581,088 | Great Britain | Oct. 1, 1946 |